Figure 1:
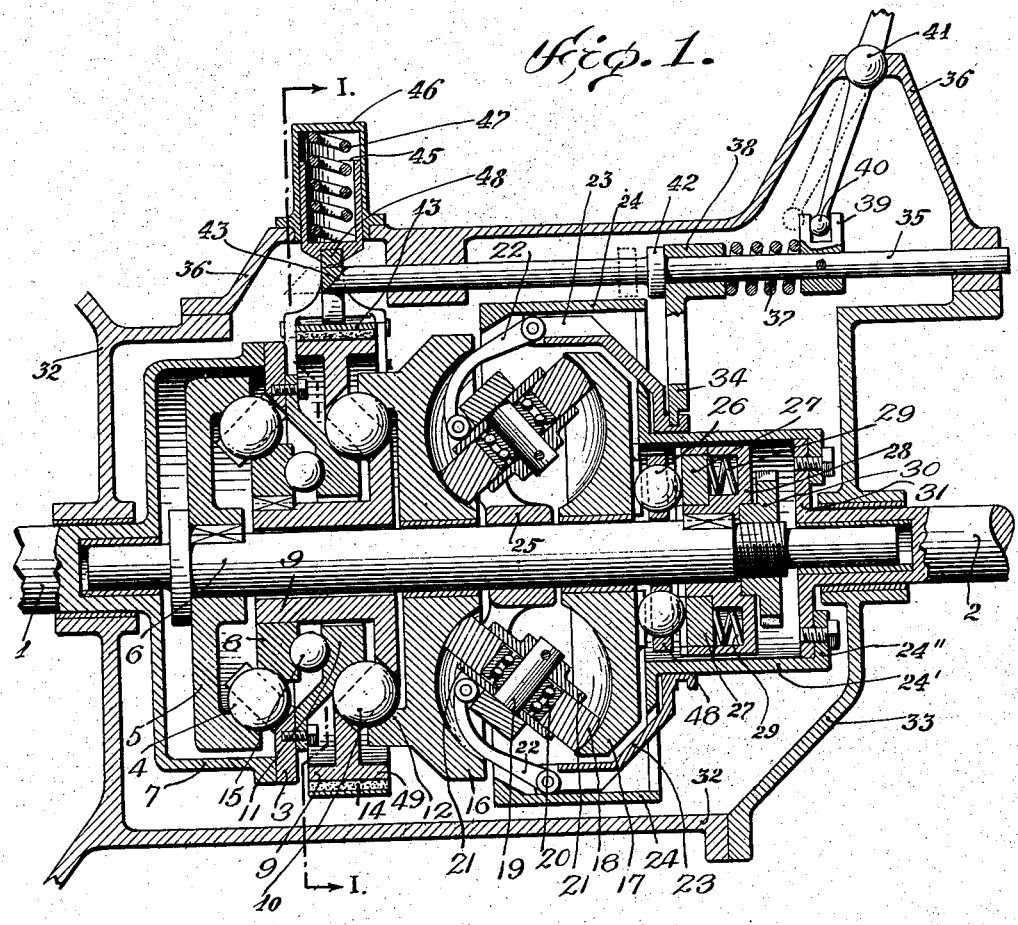

May 24, 1932.　　　R. ERBAN　　　1,859,502
SPEED CHANGE GEAR
Filed June 20, 1929　　4 Sheets-Sheet 1

INVENTOR
Richard Erban
BY
his ATTORNEY

May 24, 1932.          R. ERBAN          1,859,502
SPEED CHANGE GEAR
Filed June 20, 1928      4 Sheets-Sheet 2

Fig. 2.

Fig. 3.

INVENTOR
Richard Erban
BY
his ATTORNEY

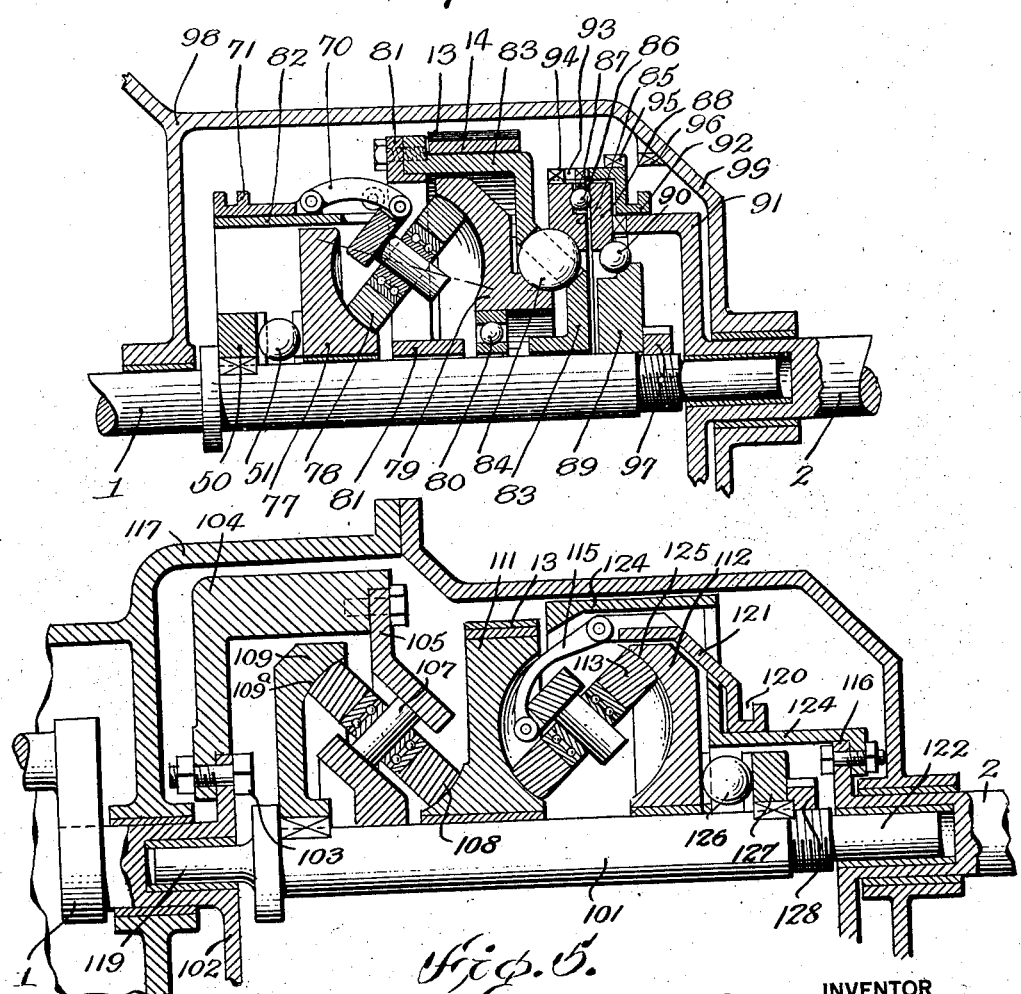

May 24, 1932.  R. ERBAN  1,859,502
SPEED CHANGE GEAR
Filed June 20, 1928   4 Sheets-Sheet 4
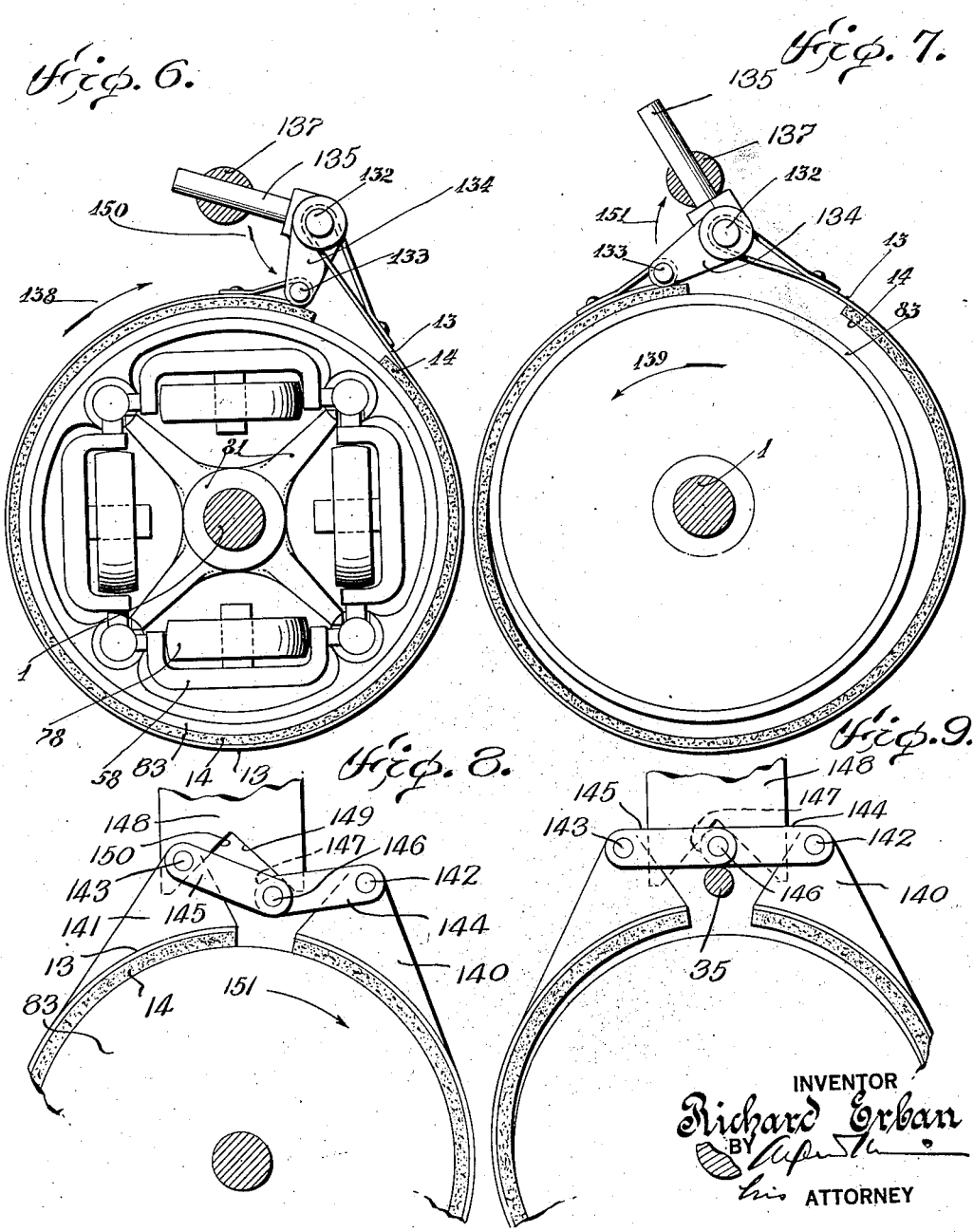
INVENTOR
Richard Erban
BY
his ATTORNEY Patented May 24, 1932

1,859,502

UNITED STATES PATENT OFFICE

RICHARD ERBAN, OF VIENNA, AUSTRIA

SPEED CHANGE GEAR

Application filed June 20, 1928. Serial No. 286,909.

My invention relates to speed-change gears and more particularly to speed-change gears, in which the gear ratio between the driving and the driven member can be continually varied above and below 1:1.

It has already been proposed to provide special couplings between the driving and the driven shaft to be operated when the gear ratio is 1:1 to permit the load to be transmitted direct from one shaft to the other with the speed-change gear in neutral so as to prevent losses and wear of the gear while the 1:1 ratio is maintained. Such an arrangement is of special advantage for gears used on motor cars, because it has been found that in the average the 1:1 ratio is more than 90% of the total running time of the car.

All the devices, however, heretofore proposed have the great drawback that the principle of continually varying the speed is omitted therefrom. Where special clutches are used for a direct coupling between the driving and the driven shaft, the power-transmission through the gear must first be cut out so that the operation of a direct-drive coupling demands on the part of the driver almost the same skill as the shifting of the present-day standard gear, which becomes even more apparent in the case of changing from high speed to lower speeds as when ascending an up-grade with a car that can not make a hill on "high".

The object of the present invention is to avoid such drawbacks and to permit a continual changing from any gear ratio up to 1:1 direct-drive. The arrangement can be such that a change from the 1:1 ratio through the speed-change gear to 1:1 direct drive is automatically effected without the use or operation of any auxiliary clutches. And furthermore, the arrangement can be such that the gear ratio between high speed and some lower speed, approximately between 20% and 35% lower than the 1:1 ratio, is automatically changed, depending on the engine torque which is applied. With the control lever fixed in a position corresponding to a speed of 0.8 to 0.65 of the engine speed (which corresponds to "second" of a three-speed standard gear-box) the gear will remain in direct drive as long as the engine torque does not exceed 20%–30% of its maximum power. Increasing the engine torque will automatically make the gear run with a reduced speed corresponding to the above mentioned position of the control lever.

These various improvements I obtain by mounting all the elements of the gear which exert a reaction torque on the gear casing loosely and rotatable on a common axis and connecting them together to form one group. I also provide brake-means to prevent said reaction group from rotating or to permit it to freely rotate, when the ratio is 1:1. In that case the reaction torque of the group (which is the algebraic sum of the reaction torques of the single elements) will be zero, and consequently, the group will rotate with the two shafts at the same speed as that of these shafts as soon as the brake is released. And if the brake is operated by the reaction torque, it will be seen that the brake will be automatically released when said reaction torque becomes zero.

Figures 2, 3:
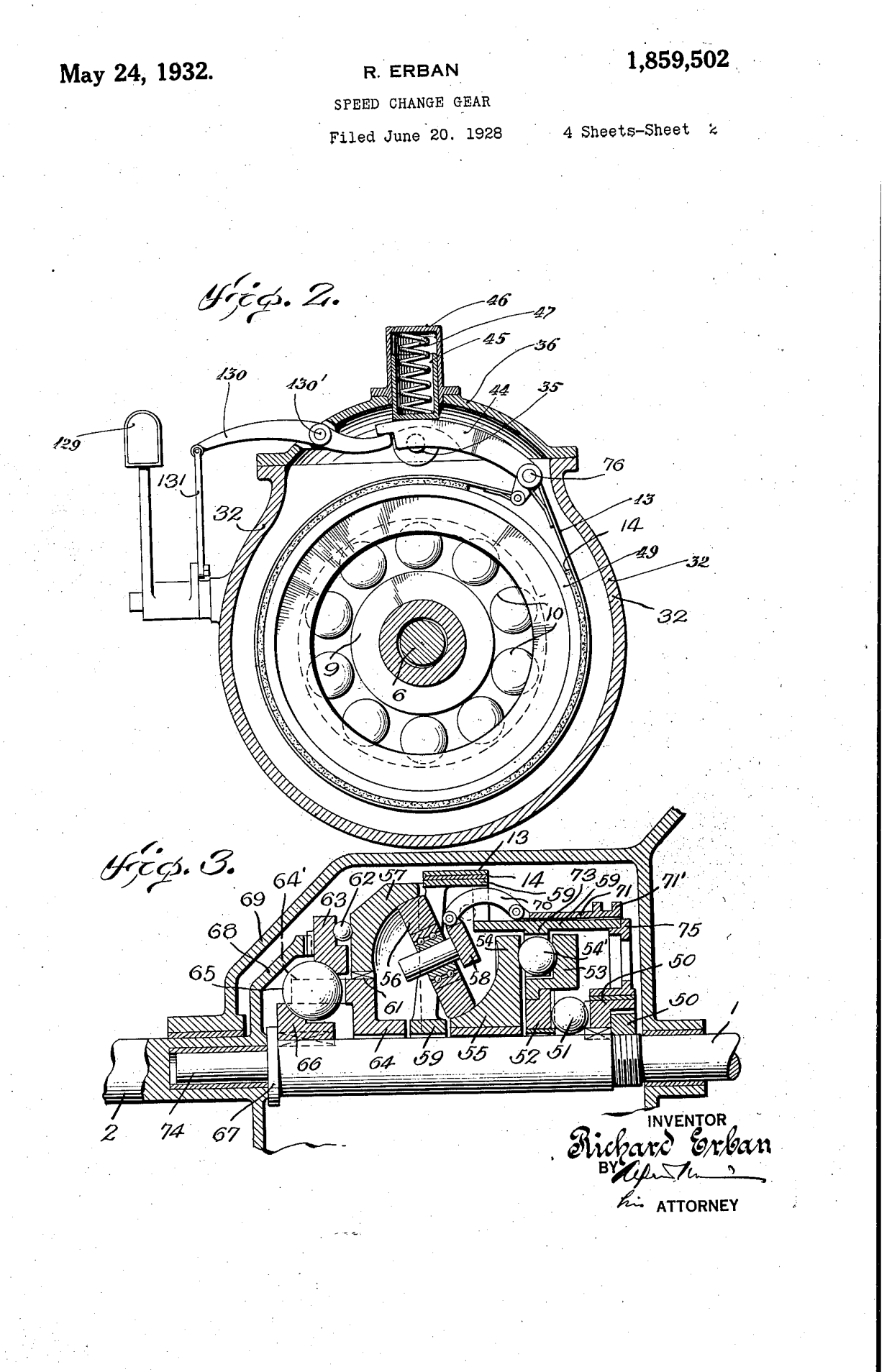

In the annexed drawings in which I have illustrated my invention, by way of example, Fig. 1 is a longitudinal section through an embodiment of my invention permitting a gradual variation of the speed of the driven shaft from 1:1 forward drive to 1:5 reverse. Fig. 2 is a sectional view showing the brake-drum of the reaction group. Fig. 3 is a longitudinal section similar to Fig. 1 showing a modification in the arrangement of the connections of the various elements. Fig. 4 is another modification, being a longitudinal section through a gear permitting variation of the speed from 1:1 to about 1:5 only for the forward drive and being provided with a separate reverse arrangement. Fig. 5 is a longitudinal section through another modified gear permitting variation of the speed from 1:1 to about 1:4 forward. Figs. 6 and 7 are sectional views of the brake for the reaction group. Figs. 8 and 9 finally are similar views as Figs. 6 and 7 showing an automatically applied brake means.

The various gears shown in the drawings are intended for use on motor cars, but obviously these gears can also be used in other cases where the 1:1 ratio predominates.

In Fig. 1, 1 is the driving shaft (engine-shaft) and 2 the driven shaft, which relation, of course, may be reversed. For instance, if a motor-car, on a down-grade, operates the engine, 2 becomes the driving shaft and 1 the driven shaft.

The speed-change gear comprises three sets of planetary gears, to wit, two planetary gears shown at 4, 5, 8 and 10, 11, 12 having a fixed gear ratio and one planetary gear shown at 16, 17, 18 having a variable gear ratio. The fixed planetary gears each comprise balls, 4 and 10 respectively, which roll on an inner race-ring 8 and 11 respectively and an outer race-ring 5 and 12 respectively. At 3 and 9 respectively are shown the cages for the two fixed planetary gears.

The variable gear comprises a plurality of rollers 18 in contact with the two race-rings shown at 16 and 17 and capable of adjustment relative thereto. They are journalled by means of ball-bearings 20 on the axes 19 of yokes and are guided on either side by guide-members 21, as more fully described and shown in my copending application, Ser. No. 243,746 filed Dec. 30, 1927. The yokes of all the rollers are enclosed in a common cage 24 provided with a cylindrical extension 24', and they are simultaneously adjusted by the reciprocation of a bushing 23 on said cylindrical extension which bushing is operatively connected with the yokes by links 22. The bushing is operated by a forked lever shown at 34. By means of a flange 24" on the end of the cylindrical extension 24', the cage 24 is secured to a flange 31 formed on the driven shaft 2, while by means of its hub 25 the cage 24 is rotatably mounted on an intermediate shaft shown at 6 in Fig. 1.

To said intermediate shaft 6 is keyed the outer race-ring 5 of the first planetary gear being secured against axial displacement on said shaft. At its other end, shaft 6 has keyed thereto the automatic pressure-device 27, 28 which by a clamping screw 30 is secured against axial displacement. The pressure device comprises balls confined between substantially flat inclined surfaces and operates as described in my Patent No. 1,585,140. For the dimensions as shown in the drawings corresponding to a proportion of 1:2 the natural size of a 25–30 h. p. gear, the angle which the inclined surfaces form with a plane perpendicular to the gear axis should be no less than 4° and no more than 8°. Inclined surfaces having an angle within these limits will provide a slipless transmission of power by the gear, if the radius of the cross-section profile of the rollers 18 at that part which makes contact with the race-rings 16 or 17 is not more than 80% of the radius of the roller itself, and preferably about 65%, provided that at the same time the spring 29 furnishes an initial pressure which is sufficient to prevent the rollers from losing contact with the race-rings, due to vibrations produced by the driving motor. All the other elements of the gear are loosely and rotatably mounted on shaft 6 and are connected with each other in the following manner.

As will be seen from Fig. 1, the inner race-ring 8 of the first planetary gear is keyed to cage 9 of the second planetary gear, which cage carries, or is formed with, a brake drum indicated at 49, forming the freely rotatable reaction group. The inner race-ring 11 of the second planetary gear is secured to cage 3 of the first planetary gear which cage in turn is secured to the cylindrical shaft 7 forming part of the driving shaft 1. Between the two race-rings 8 and 11 is provided the thrust bearing 15. The outer race-ring 12 of the second planetary gear is secured to, or formed integrally with, the race-ring 16 of the variable gear which ring is rotatable on shaft 6. The other race-ring, 17, of the variable gear is rotatably connected with shaft 6 by means of pressure-balls 26 held between inclined faces.

Around the above said brake-drum 49 passes a brake-band 13 provided with a brake lining indicated at 14, as more clearly shown in Fig. 2. As shown in said figure, the brake-band 13 is secured at one end to a bolt 76 in the casing, while at the other end the brake-band can be tightened around the drum by means of a lever 44. A spring 47 located in a hood 46 and bearing against a sliding element 45 presses down on lever 44 thus holding the brake-band 13 tightened. Lever 44, however, can be rocked about its fulcrum at 76 against the pressure of spring 47 to release the brake. This I accomplish either by means of a lever 130 fulcrumed to the casing at 130' and connected by a rod 131 to a pedal 129, or by means of a sliding rod, shown in Fig. 1 at 35. The latter can be longitudinally shifted by an arm 41 engaging with its ball-shaped end 40 a grooved collar 39 secured to rod 35. At 42 is shown an abutment on rod 35, against which abutment bears the hub 38 of the forked lever 34 being pressed against said abutment by a spring 37 encircling rod 35 between said hub and the grooved collar 39. Therefore, if the rod is shifted toward the left in Fig. 1, into the position shown in broken lines, a cam face 43 provided at the forward end of the rod will raise the lever 44 against the action of the spring 47 releasing the brake. As spring 37 is compressed by the shifting of the rod 35 just described, the latter will automatically return to its full-line position, corresponding to the 1:1 gear ratio between the driving and the driven shaft. The entire gear is enclosed in the casing 32 provided with the cover plate 33 (Fig. 1); the levers 44 and 41 are mounted in the top cover 36.

The operation of the gear is as follows:

When the brake-band is tightened, the reaction group and, therefore, the cage 9 and the inner race-ring 8 are at rest, whereas cage 3 rotates with the engine shaft, i. e., the driving shaft 1 compelling the outer race-ring 5 to run at a higher speed than that of the driving shaft. If the parts are proportioned as shown in Fig. 1, race-ring 5 will run at a speed about 1.7 times that of the engine speed, and all the parts connected with ring 5 will rotate at the same speed, to wit. shaft 6, the pressure-device 26, 27, 28, 29, 30 and race-ring 17 of the variable gear.

The inner race-ring 11 of the second planetary gear rotates with the driving shaft 1, but as cage 9 is at rest, the balls 10 revolve in loco, and the outer race-ring 12 rotates in opposite direction at reduced speed (with the proportions as shown at 0.7 of the speed of the driving shaft). Race-ring 16 which is connected or formed integral with the outer race-ring 12 rotates at the same speed, i. e., at 0.7 of the speed of the driving shaft, also in opposite direction.

The rollers 18 of the variable gear revolve, corresponding to the difference in the speeds at the points, where they contact with the race-rings 16 and 17. In the position shown in Fig. 1, the centers of rollers 18 and the cage 24 revolve in the same direction at the speed of the driving shaft. If the rollers 18 are shifted to the other end position from that shown in Fig. 1, the forward speed imparted to the rollers by the race-ring 17 is reduced, while at the same time the backward speed imparted to the rollers by the race-ring 16 is increased with the result that the speed of the centers of the rollers and of the cage 24 drops, until the opposite speeds imparted to the rollers by the two race-rings 16 and 17 are equal. At that moment, cage 24 and the driven shaft 2 are at rest. When thereupon the rollers 18 are shifted still further, the backward speed imparted to the rollers will predominate, and the centers of the rollers and cage 24 and thereby also the driven shaft will revolve in a direction opposite to that of the driving shaft.

In a similar manner as the speeds in the variable gear combine, the forces of reaction combine in the reaction group. The force of reaction of the inner race-ring 8 is in the direction of the driving shaft, whereas the force of reaction of cage 9 is in the opposite direction since the outer ring 12 is the driving element and the inner ring 11 the driven element. When the rollers are in the 1:1 position, the two forces of reaction are equal. However, if the rollers are shifted in a direction of reduced speed, their paths on the race-ring 16 becomes larger and on the race-ring 17 smaller. Therefore, the torque on the race-ring 16 becomes greater and on the race-ring 17 smaller (provided the torque of the driven shaft is constant) and therefore, in the reaction group the torque of cage 9 preponderates opposite to the direction of rotation of the driving shaft. If the reaction group is not prevented from rotating in that direction, the gear does not transmit any force, the driven shaft will stop at the slightest resistance, and the brake of the reaction group can then be also used as a coupling as shown in Fig. 2. From that figure it will appear that by pressing down on pedal 129 one can, by means of the connecting rod 131 and lever 130, release the brake-band.

If in the 1:1 position of rollers 18 the brake-band is released, only the frictional forces will act on the reaction group, since the forces of reaction are equal, and these frictional forces will set the reaction group into motion in the direction of rotation of the driving shaft. As soon as the reaction group has reached the speed of the driving shaft, there is no longer any cause for the race-ring 5 to run at a higher speed than the driving shaft, and therefore, the race-rings 5 and 12 will have the speed of the driving shaft and will rotate in the same direction And as likewise the race-rings 16 and 17 no longer rotate in opposite direction but rotate at the same speed in the same direction, also the rollers 18 will no longer revolve about their axes 19, and only their centers and cage 24 will continue to revolve with the speed of the driving shaft. In the entire gear there is no longer any movement of the elements relative to each other, tho the power of the driving shaft 1 continues to be transmitted to the driven shaft through the gear. And as the entire gear revolves at an entity, there are no losses, there is no heating, and no wear. There is also no interruption in the power transmission between the driving and the driven shaft, and neither in the varying of the gear, when the power is thus transmitted direct with the gear in neutral, i. e., the gear rotating as a unit. From this it will be clear that also the change from direct drive to any other speed can be effected without any difficulty in the following manner.

If arm 41 is moved from its 1:1 end-position toward lower speeds, then at first the spring 47 is permitted to tighten the brake-band 13 thereby closing the brake. The reaction group is thereby stopped, the race-rings 16 and 17 rotate in the opposite direction, and the rollers 18 revolve about their axes without any immediate change in the gear ratio. Only, when by a further movement of arm 41 the rollers by means of the forked lever 34, the bushing 23 and links 22 are moved from their 1:1 position to another position, the gear ratio is correspondingly varied. The gear could also be used to obtain higher gear ratios than 1:1, that is to rotate the driven shaft at a higher speed than the driving shaft. To this end, it is only necessary to move the rollers 18 from their 1:1 position so far that their paths on the race-ring 17 become greater than corresponded to the 1:1 position. In that case, the reaction force of the drum 49 becomes negative, that is to say, it is in the same direction as the direction of rotation of the driving shaft.

In Fig. 3 is shown a different arrangement of three planetary gears on a common axis, but the range of variations is the same as that of the above described construction. If the proportions are assumed to be those shown on the drawings, the speed of the driven shaft can be varied from direct drive over zero to about ⅙ reverse of the speed of the driving shaft.

At its forward end, the driving shaft 1 carries the pressure-device 50, 51, 52 which is longitudinally adjustable by means of the screw 72. For purposes of simplicity in the illustration, no springs for effecting an initial pressure are shown. The pressure-ring 52 is secured to the outer race-ring 53 but is freely rotatable on shaft 1 and capable of longitudinal displacement thereon. At its other end, shaft 1 has keyed thereto and secured against longitudinal movement by the collar 67 the outer race-ring 66 of the ball-planetary gear 63, 64, 65, 66. The two race-rings 55 and 57 and the cage 59 of the variable gear are rotatably mounted on shaft 1 and capable of longitudinal displacement thereon. The race-ring 55 is secured to, or integrally formed with, the inner race-ring 54 of the ball-planetary gear 53, 54', 54. The cage 73 of this gear is secured to, or formed integral with, the cage 59 which, at its forward end is rotatably journalled by means of the disk 75 on shaft 1 or the pressure-ring 50. The race-ring 57 is keyed to the cage 64 by means of the key 61 and together with said cage can freely rotate on shaft 1. The race-ring 57 transmits the axial pressure by means of the thrust-bearing 62 to the outer race-ring 63, and the driven shaft 2 is securely connected to said race-ring by means of the hollow extension 68. At its forward end, shaft 1 is journalled direct in the casing of the gear, whereas at its rear end at 74, it is journalled in a bore of shaft 2. The adjustment of the rollers 56 which are rotatably journalled on the axes of the yokes 58 is effected by the slide-bushing 71 by means of the pivoted links 70. The bushing 71 is displaced in a similar manner as shown in Fig. 1 by means of an arm (not shown) engaging a grooved ring portion 71' formed on bushing 71. The cages 59 and 73 which constitute the reaction group are acted upon by the brake-band indicated at 13 encircling the brake-drum indicated at 14. The operation is as follows:

If the reaction group is stopped from rotation by the brake, the balls 54' will revolve in loco without rotating so that the race-ring 55 is compelled to rotate opposite to the direction of rotation of the driving shaft 1. Consequently, the rollers 56 impart to the race-ring 57 a rotation in the same direction as the shaft 1, the speed of rotation depending on the position of the rollers. The inner race-ring 66 rotates with the speed of the driving shaft and if the cage 64 by the race-ring 57 is likewise rotated with the speed of the driving shaft, also the outer race-ring 63 must rotate with that speed. The thrust-bearing 62 then is at rest.

If the planetary gear 53, 54, 54' is built like a normal thrust-bearing, the rollers 56 must be moved to a horizontal position, that is to say, their axes of rotation must be perpendicular to the axis of the gear, in order that the race-ring 57 will rotate with the speed of the driving shaft and the gear-ratio of 1:1 is obtained. It is clear that in that case the forces of reaction, which, on the one hand, are exerted by the balls 54' on cage 73 in the direction of rotation of the driving shaft, and, on the other hand, by the rollers 56 on the cage 59 opposite to that direction, are equal and thus outwardly balance each other. Therefore, after the brake is released, the reaction group is subject only to the frictional forces which cause its rotation together with the shaft. To the same extent, the race-ring 55 reduces its speed of rotation in the opposite direction and also commences to rotate together with shaft 1, until finally cage 59 and race-ring 55 have the same speed as the driving shaft. The speed of race-ring 57 which already rotated with the speed of the driving shaft, is in no way affected so that the driven shaft will rotate with the ratio 1:1 as before. After the reaction group including the cage 59 and race-ring 55 have reached the speed of the engine shaft, the entire gear rotates as a whole constituting a rigid coupling between the shafts 1 and 2. The brake-band 13 in the case of the 1:1 gear ratio can be released in the same manner as described in connection with the construction shown in Fig. 1.

The position of the rollers 56 shown in Fig. 3 corresponds to the reverse drive of the driven shaft 2. When the rollers are shifted toward a horizontal position, the speed of the driven shaft is first reduced until it reaches 0, and then is gradually increased to the speed of the driving shaft rotating in the same direction. When the rollers 56 are shifted to beyond the horizontal position, the driven shaft will rotate faster than the driving shaft, and the reaction force of the group 59—73 becomes negative.

In the modification of Fig. 4 are shown only two planetary gears for forward drive, one having a fixed and the other a variable gear ratio. The control of the speed is from 1:1 to 1:5 as the lowest speed. The rollers 78 are shown in Fig. 4 in the position corresponding to the lowest speed. A stopping of the driven shaft 2 can be effected only by a release of the brake acting on the reaction group. For backward drive there is provided a reverse stage, enabling the variation of the speed during backward drive within the same limits as for the forward drive. As regards the operation of the forward drive, therefore, and the direct drive, the backward drive need not be considered. The race-ring 77 is rotated by the driving shaft 1 by means of the pressure device 50, 51 in the same direction and at the same speed as the driving shaft. When the brake 13, 14 is in on-position and therefore the interconnected cages 81 and 83 which constitute the reaction group are at rest, the race-ring 79 must rotate opposite to the direction of rotation of driving shaft 1, its speed of rotation being dependent on the position of the rollers 78. The planetary gear 79, 84, 85 having a fixed gear ratio, the direction of rotation of the inner race-ring is changed and consequently, the outer race-ring 85 must rotate in the direction of the driving shaft. In the planetary gear 79, 84, 85 will occur a reduction in speed, so that the outer race-ring 85 rotates with the speed of the driving shaft only, if in the variable planetary gear 77, 78, 79 a similar increase in speed takes place. This will happen if the rollers 78 rotate in the plane indicated in Fig. 4 by the broken lines. For the forward drive, the race-ring 85 is rigidly connected with the cylindrical extension 91 of the driven shaft 2 as hereafter described. The axial pressure of the race-ring 85 is transmitted by the balls 86 to the race-ring 88 which in the manner hereafter described is rigidly connected with the cylindrical extension 91 of the driven shaft 2. The race-ring 88, in its turn, transmits the pressure by means of the pressure bearing 90—89 and the set-screw 97 to the driving shaft 1. The said pressure bearing rotates with the difference in the number of revolutions of the driving and the driven shaft. When the rollers 78 occupy a position corresponding to the 1:1 ratio, the reaction forces on the cages 81 and 83 balance each other, in a similar manner as shown in connection with the construction shown in Fig. 3. The release of the brake in this case also results in the reaction group being subject only to the frictional forces so that said group rotates with the driving shaft 1. As soon as it has reached the speed of the driving shaft, there is no further relative movement of the parts of the gear, and consequently the gear acts as a coupling between the two shafts 1 and 2.

The driven shaft is directly connected with the race-ring 88, which is operatively connected with the race-ring 85, as long as the cage 87 of the pressure-bearing 86 is rotatively connected with the race-ring 85. This is effected by the sliding member 92 which by means of the clutch-teeth 93 is permanently rotatively coupled with cage 87. The sliding member 92 is slidingly and rotatably mounted on the cylindrical extension 91 of the driven shaft. In the position of the parts as shown in Fig. 4, the clutch-table of the sliding member engage similar teeth 94 on the race-ring 85. In that way, the cage 87 must rotate with ring 85 and, therefore, also the other race-ring, 88, must rotate with the same speed. If the sliding member 92 is withdrawn, i. e., moved toward the right in Fig. 4, so that the teeth 93 and 84 become disengaged, the cage 87 will rotate only with half the speed of the race-ring 85, and consequently the race-ring 88 and also the shaft 2 will be at rest. This corresponds to the free run position. If the sliding member 92 is still further shifted toward the right in Fig. 4, until the clutch-teeth shown at 95 engage corresponding teeth 96 on the casing 99, cage 87 is stopped and race-ring 88 is compelled to rotate in a direction opposite to that of ring 85, which corresponds to the backward drive.

Fig. 5 shows a combination of two planetary gears which permits a speed variation including the gear ratio 1:1, without any change in the direction of movement within the gear.

The driving shaft 1 carries a drum-shaped flywheel 104 which is secured by bolts 103 to a flange 102 formed at the end of the driving shaft 1 and moreover is secured to the cage 105, the hub 106 of which is loosely mounted on the intermediate shaft 101. Within cage 105 are rotatably journalled on pivots 107 the rollers 108. The outer race-ring 109 for these rollers is keyed to the intermediate shaft 101, while the inner race-ring 110 is loosely mounted on said shaft being capable of longitudinal displacement thereon and rigidly connected, or formed integrally, with the race-ring 111 of the variable gear. The other race-ring, 112, of said variable gear is operatively connected by means of the pressure device 126, 127, 128 with the intermediate shaft 101. The cage 124 of the rollers 113 is secured to a flange 116 formed on the end of the driven shaft 2. The rollers 113 are rotatably mounted on the axes 114 of the adjustable yokes, and all the rollers can be simultaneously adjusted, in a similar manner as described in connection with Fig. 1, by means of pivoted links 115 through axial displacement of the sliding member 121. If the two race-rings 110 and 111 forming the reaction group are prevented by the brake 13, from rotating, the race-ring 109, the intermediate shaft 101 and thereby the race-ring 112 must rotate at a righer speed than the driving shaft 1, but in the same direction. By the rollers 113, this speed is reduced depending on the position of said rollers. With the rollers occupying the position shown in Fig. 5, the ratio of 1:1 is obtained, if the diameters of the contacting circles at the points 110ª, 123 and at the points 109ª, 125 are the same. When the reaction group 110, 111 is released, the reaction group as well as intermediate shaft 101 together with the race-rings 109 and 112 will rotate, after a short while, with the speed of the driving shaft, because of the frictional forces. The torques exerted at the points 110ª and 123 are equal and opposed to each other. The torque in 110 is in the direction of rotation of the driving shaft and therefore a negative reaction force. The frictional forces are also in the direction of rotation of the driving shaft and therefore, are likewise negative reaction forces. The torque in 110 is smaller than the torque in 113 for all positions of the rollers which impart to the shaft a rotation at a reduced speed. The reaction force of the groups 110, 111 therefore, is positive in these cases, that is, it is opposed to the direction of rotation of the driving shaft. The reaction force of the group 110, 111 on the brake is the sum of the said three torques and therefore zero, before the rollers arrive at the exact 1:1 position, which is the case the sooner, the greater the frictional force is. If the frictional force equals 5% of the total torque of the driving shaft, the reaction force becomes zero already when the driven shaft 2 has a speed of only 0.95 of the driving shaft. If in that position the brake is released, rotation is transmitted at the ratio of 1:1. If the frictional force is maintained approximately constant, e. g., 5% of the maximum torque of the driving shaft, this means 20% at one-fourth of the capacity of the engine. Therefore, at one-fourth of the capacity of the engine, the reaction force becomes zero already when the driven shaft has a speed of only 0.8 of the speed of the driving shaft, and when the brake 13, 14, is released, rotation is transmitted between the two shafts at the ratio of 1:1.

If the brake acting on the reaction group is arranged as shown in Figs. 6 and 7, the reaction group is automatically released, as soon as the reaction force becomes zero or slightly negative, but the brake is automatically closed, when the reaction force becomes positive. For this purpose, one end of the brake-band 13 is connected to the bolt 132 of lever 134 and the other end to the bolt 133. Lever 134 forms with the rod 135 a bell-crank lever and through said rod can be rotated and rocked in the circumferential direction of the brake-drum 83. When the latter rotates in the direction of the arrow 138, the brake-band 13, 14 moves in the same direction, and bell-crank lever 134, 135 is rocked in the direction of arrow 150 resulting in a tightening of the brake-band. The rod 135 freely slides in a bore of a rotatable member 136. It is clear that the reaction group, 81—83 shown in Fig. 4, as regards all positive reaction forces (in the direction of arrow 138, Fig. 6) is automatically subjected to the action of the brake and prevented from rotating. As soon as the direction of rotation of the brake-drum is reversed, as indicated by the arrow 139 in Fig. 7 and the brake-band 13, 14 follows that movement, the bell-crank lever 134, 135 is rocked in the direction of the arrow 151, whereby the brake-band 13, 14 is lengthened and the brake, therefore, is opened. The rotatable guide member 137 for the rod 135 arrives in the position as indicated in Fig. 7.

In Fig. 6 is shown the cage 81 of Fig. 4 containing the rollers 78 mounted in the movable yokes 58 in side elevation. The adjusting links 70 have been omitted for the sake of simplicity.

The automatic action of the brake on the reaction group by the reaction force can also be effected in both directions, as shown by Figs. 8 and 9, where the two ends of the brake-band each are provided with a jaw 140 and 141 respectively, which by means of the joints 142 and 143 respectively and the toggle-levers 144, 145 are connected with each other. On the central joint 146 of the toggle-lever is provided a roller 147, which cooperates with the inclined faces 149, 150 of the abutment 148. When the brake-drum 83 rotates in either direction, for example, in the direction of the arrow 151, roller 147 is forced down by the inclined face 149 whereby the toggle-lever is operated to tighten the brake band (Fig. 8). If, on the other hand, the roller 147 is moved into the angle formed by the inclined faces 149, 150, the toggle-lever is straightened, resulting in the brake-band being released (Fig. 9). This can be accomplished in the same manner as shown in Figs. 1 and 2 for the brake-lever 44. At 35 in Fig. 9 is indicated the slide-rod 35, also shown in Fig. 1, used for operating the toggle-lever.

The automatic brake actuating means shown in Figs. 6–9 can be used, of course, in connection with any of the speed-change gears shown in the drawings.

I claim:

1. In combination, a rotatable driving member, a rotatable driven member, and a variable speed friction gear connection between said members including race rings and cooperating rolling bodies movable with respect to one another to establish ratios above and below one-to-one between said members, and all movable together as a unit to establish a direct drive connection between said members.

2. In combination, a rotatable driving member, a rotatable driven member, and a variable speed friction gear connection between said members including cooperating parts movable with respect to one another to establish a one-to-one angular velocity ratio and ratios above and below one-to-one between said members, the said cooperating parts of said gear being arranged to rotate as a unit with said driving and driven members when said parts are in a position establishing a one-to-one gear ratio between said members.

3. In combination, a rotatable driving member, a rotatable driven member, and a variable speed friction gear connection between said members comprising a plurality of planetary gears arranged for cooperation with one another to establish ratios above and below one-to-one between said members, and all movable together as a unit to establish a direct drive connection between said members.

4. In combination, a rotatable driving member, a rotatable driven member, and a variable speed friction gear connection between said members comprising a plurality of cooperating planetary gears each inclusive of a pair of rotatable race rings and rolling elements therebetween, the rolling elements of one of said gears being mounted for adjustment with respect to and to roll against and also to rotate with its related race rings, thereby to establish a one-to-one angular velocity ratio and ratios above and below one-to-one between said members.

5. In combination, a rotatable driving member, a rotatable driven member, and a variable speed friction gear connection between said members comprising a plurality of cooperating planetary gears each inclusive of a pair of race rings and rolling elements therebetween, the race rings of at least one of said gears being rotatable and the rolling elements of that gear being mounted for adjustment to shift their points of contact with said rings radially with respect to the latter, said last mentioned rolling elements also being mounted to roll against and to rotate with said race rings, thereby to establish a one-to-one angular velocity ratio and ratios above and below one-to-one between said members.

6. In combination, a rotatable driving member, a rotatable driven member, and a variable speed friction gear connection between said members comprising a plurality of cooperating planetary gears each inclusive of a pair of rotatable race rings and rolling elements therebetween, the rolling elements of one of said gears being mounted for adjustment to shift their points of contact with their related race rings radially with respect to the latter and also to roll against and to rotate with said race rings, and releasable brake means for cooperation with one of said gears to hold one of the rotatable elements thereof against rotation.

7. In combination, a rotatable driving member, a rotatable driven member, and a variable speed friction gear connection between said members comprising a plurality of cooperating planetary gears each inclusive of a pair of rotatable race rings and rolling elements therebetween, the rolling elements of one of said gears being mounted for adjustment to shift their points of contact with their related race rings radially with respect to the latter and also to roll against and to rotate with said race rings, and releasable brake means for cooperation with one of said gears to hold the rolling elements thereof against rotation with their related race rings.

8. In combination, a rotatable driving member, a rotatable driven member axially alined with said driving member, and a variable speed friction gear connection between said members comprising race rings and rolling bodies cooperating with one another to establish a one-to-one angular velocity gear ratio and ratios above and below one-to-one between said members, all of said race rings and rolling bodies being mounted for rotation on an axis coincident with the axes of said driving and driven members, and being adapted for unitary rotation to establish a direct drive connection between said members.

9. In combination, a rotatable driving member, a rotatable driven member, a variable speed friction gear connection between said members comprising a plurality of planetary gears arranged for cooperation with one another to establish a one-to-one angular velocity ratio and ratios above and below one-to-one between said members, each of said gears including a pair of race rings and rolling elements therebetween, the rolling elements of one of said gears being adjustable to shift their points of contact radially with respect to their related race rings, and a torque responsive pressure device for urging one of the race rings of said last mentioned gear towards the other race ring of said gear.

10. In combination, a rotatable driving member, a rotatable driven member, and a variable speed friction gear connection between said members effective to establish a one-to-one angular velocity ratio and ratios above and below one-to-one between said members, said connection including a pair of rotatable race rings, rolling elements between said race rings adjustable to shift their points of contact with said rings radially with respect to the latter, said rolling elements being mounted to roll against and to rotate with said race rings, a planetary gear between one of said race rings and one of said members, a connection between said rolling elements and the other of said members, and a torque responsive pressure device acting through said planetary gear to urge said race rings towards one another.

11. In combination, a rotatable driving shaft, a rotatable driven shaft axially alined with said driving shaft, a third shaft between and loose with respect to and axially alined with said driving and driven shafts, a pair of race rings rotatably mounted on said third shaft, rollers between said race rings, a cage fixed to said driven shaft and carrying said rollers, means for adjusting said rollers to shift their points of contact with said race rings simultaneously inward with respect to one ring and outward with respect to the other ring, a planetary gear connection between said driving shaft and one of said race rings, and a torque responsive pressure device acting directly against one of said race rings, and reacting through said third shaft and said planetary gear against the other of said race rings to urge the latter against said rollers.

12. In combination, a rotatable driving shaft, a rotatable driven shaft axially alined with said driving shaft, a third shaft between and loose with respect to and axially alined with said driving and driven shafts, a pair of race rings rotatably mounted on said third shaft, rollers between said race rings, a cage fixed to said driven shaft and carrying said rollers, means for adjusting said rollers to shift their points of contact with said race rings, simultaneously inward with respect to one ring and outward with respect to the other ring, a planetary gear connection between said driving shaft and one of said race rings, said planetary gear connection comprising a race ring fixed to said third shaft, a combined race ring and roller carrier element loose on said third shaft, a combined race ring and roller carrier element fixed to said driving shaft, rollers carried by said last mentioned element and disposed between the race ring that is fixed to said third shaft and the race ring of said first mentioned element, rollers carried by said first mentioned element and disposed between the race ring of said second mentioned element and one of the race rings of the pair first mentioned, a releasable brake device for holding said first mentioned element against rotation, and a torque responsive pressure device acting directly against the other of the pair of race rings first mentioned and indirectly through said third shaft and said planetary gears against the first of said pair of race rings first mentioned to force said rings into frictional engagement with the adjustable rollers disposed therebetween.

13. In combination, a rotatable driving shaft, a rotatable driven shaft axially alined with said driving shaft, a pair of race rings rotatably mounted on said driving shaft, rollers between said race rings, a cage rotatably mounted on said driving shaft and carrying said rollers. means for adjusting said rollers to shift their points of contact with said race rings simultaneously inward with respect to one ring and outward with respect to the other ring, a torque responsive pressure device between said driving shaft and one of said race rings, a brake for cooperation with said cage, a race ring carried by said driven shaft, and a planetary gear comprising rolling elements carried by said cage and disposed between said last mentioned race ring and the other of said pair of race rings first mentioned.

14. In combination, a rotatable driving shaft, a rotatable driven shaft axially alined with said driving shaft, a pair of race rings rotatably mounted on said driving shaft, rollers between said race rings, a cage carrying said rollers, means for adjusting said rollers to shift their points of contact with said race rings simultaneously inward with respect to one ring and outward with respect to the other ring, a brake for cooperation with said cage, a race ring fixed to said driving shaft, a race ring carried by said driven shaft, rolling elements carried by one of said pair of race rings first mentioned and disposed between the race ring that is fixed to said driving shaft and the race ring that is carried by said driven shaft, and a torque responsive pressure device between said driving shaft and the other of the pair of race rings first mentioned.

15. In combination, a rotatable driving shaft, a rotatable driven shaft axially alined with said driving shaft, a third shaft between and axially alined with said driving and said driven shafts, a pair of race rings rotatably mounted on said third shaft, rollers, between said race rings, a cage fixed to said driven shaft and carrying said rollers, means for adjusting said rollers to shift their points of contact with said race rings simultaneously inward with respect to one ring and outward with respect to the other ring, a race ring fixed to said third shaft, a ring, a race ring fixed to said driving shaft, roller carrier fixed to said driving shaft, rollers carried by said carrier and disposed between the race ring that is fixed to said third shaft and one of said pair of race rings first mentioned, a brake for cooperation with the latter race ring, and a torque responsive pressure device between said third shaft and the other of said pair of race rings first mentioned.

16. In combination, a rotatable driving member, a rotatable driven member, and a variable speed friction gear connection between said members comprising race rings and cooperating rolling bodies, said race rings and rolling bodies being mounted for rotative adjustment to shift their points of contact with respect to each other and being relatively rotatable to establish angular velocity ratios above and below one-to-one between said driving and driven members, said race rings being mounted for rotation and said rolling bodies being mounted to rotate with said race rings to establish a direct drive connection between said members.

17. In combination, a rotatable driving member, an axially alined rotatable driven member, a variable speed friction gear connection between said members including race rings and cooperating rolling bodies all rotatable as a unit about an axis coincident with the axes of said driving and driven members to establish a direct drive connection between said members, and means whereby said race rings and rolling bodies are adapted for relative adjustment and relative rotation to establish angular velocity ratios above and below one-to-one between said driving and driven members.

18. In combination, a rotatable driving member, an axially alined rotatable driven member, a variable speed friction gear connection between said members including race rings and cooperating rolling bodies disposed constantly in operative engagement with one another and all rotatable as a unit about an axis coincident with the axes of said driving and driven members to establish a direct drive connection between said members, and means whereby said race rings and rolling bodies are adapted for relative adjustment and relative rotation to establish angular velocity ratios above and below one-to-one between said driving and driven members.

In testimony whereof I affix my signature.
RICHARD ERBAN.